US008553992B2

(12) United States Patent
Thind

(10) Patent No.: US 8,553,992 B2
(45) Date of Patent: Oct. 8, 2013

(54) DETERMINATION OF CLASS, ATTRIBUTES, AND IDENTITY OF AN OCCUPANT

(76) Inventor: Deepinder Singh Thind, Mankato, MN (US)

( * ) Notice: Subject to any disclaimer, the term of this patent is extended or adjusted under 35 U.S.C. 154(b) by 1053 days.

(21) Appl. No.: 12/274,344

(22) Filed: Nov. 19, 2008

(65) Prior Publication Data

US 2010/0124376 A1    May 20, 2010

(51) Int. Cl.
*G06K 9/00* (2006.01)
*G06K 9/62* (2006.01)
*G06K 9/68* (2006.01)
*G06K 9/70* (2006.01)
*B60Q 1/00* (2006.01)

(52) U.S. Cl.
USPC ........... 382/226; 382/103; 382/104; 382/118; 382/224; 340/438; 340/457

(58) Field of Classification Search
USPC ................. 382/103, 104, 154, 115, 118, 224; 340/425.5, 438, 457.1, 538, 561, 426; 348/143, 148, 151–156, 159
See application file for complete search history.

(56) References Cited

U.S. PATENT DOCUMENTS

| | | | | |
|---|---|---|---|---|
| 5,555,512 A | * | 9/1996 | Imai et al. | 702/127 |
| 5,909,378 A | * | 6/1999 | De Milleville | 700/276 |
| 6,081,619 A | * | 6/2000 | Hashimoto et al. | 382/181 |
| 6,645,066 B2 | * | 11/2003 | Gutta et al. | 454/229 |
| 6,768,420 B2 | * | 7/2004 | McCarthy et al. | 340/573.1 |
| 6,801,662 B1 | * | 10/2004 | Owechko et al. | 382/224 |
| 6,968,073 B1 | * | 11/2005 | O'Boyle et al. | 382/104 |
| 7,406,181 B2 | * | 7/2008 | O'Boyle et al. | 382/104 |
| 7,417,536 B2 | * | 8/2008 | Lakshmanan et al. | 340/538 |
| 7,469,060 B2 | * | 12/2008 | Bazakos et al. | 382/173 |
| 7,587,064 B2 | * | 9/2009 | Owechko et al. | 382/103 |
| 7,715,591 B2 | * | 5/2010 | Owechko et al. | 382/104 |
| 2005/0111700 A1 | * | 5/2005 | O'Boyle et al. | 382/104 |
| 2005/0171645 A1 | | 8/2005 | Oswald et al. | |
| 2005/0201591 A1 | * | 9/2005 | Kiselewich | 382/104 |

OTHER PUBLICATIONS

Kale, A.; Rajagopalan, A.N.; Cuntoor, N.; Kruger, V.; , "Gait-based recognition of humans using continuous HMMs," Automatic Face and Gesture Recognition, 2002. Proceedings. Fifth IEEE International Conference on , vol., No., pp. 336-341, May 21-22, 2002.*
Trivei et al, Dynamic Context Capture and Distributed Video Arrays for Intelligent Spaces, IEEE Transactions on Systems, MAN, and Cybernetics—Part A: Systems and Humans, vol. 35, No. 1, Jan. 2005 145.*
Voila et al, Robust Real-Time Face Detection International Journal of Computer Vision 57(2), 137-154, 2004.*

* cited by examiner

*Primary Examiner* — Andrae S Allison
(74) *Attorney, Agent, or Firm* — Ash Tankha; Lipton, Weinberger & Husick

(57) ABSTRACT

Disclosed herein is a method and system for determining class, attributes, and identity of an occupant in an occupancy space. An infra-red image of the occupant in the occupancy space is captured. The infra-red image information of the captured image is digitized to obtain a thermal signature of the occupant. The thermal signature of the occupant is compared with thermal signatures, characteristics, and attributes common to a class of occupants stored in a thermal signature database to determine the class, the attributes, and the identity of the occupant. The determination of the class and the attributes may, for example, comprise distinguishing between an animate occupant and an inanimate occupant, analyzing gait of the animate occupant for distinguishing between human motion and non-human motion, and enumerating occupants in the occupancy space using an edge detection algorithm.

17 Claims, 5 Drawing Sheets

DETERMINATION OF CLASS, ATTRIBUTES, AND IDENTITY OF AN OCCUPANT

BACKGROUND

This invention, in general, relates to occupancy detection. More particularly, this invention relates to determination of class, attributes, and identity of an occupant in an occupancy space.

Occupancy detectors are typically used for lighting automation and in burglar alarms. Conventional occupancy detectors may, for example, be passive infra-red sensors or Doppler effect sensors. Passive infra-red sensors sense lateral motion across the field of view of the sensors but are generally insensitive to motion in line with the field of view. Doppler effect sensors sense motion in line with the field of view but are generally insensitive to lateral motion across the field of view. Hybrid sensors utilize both passive infra red sensors and Doppler effect sensors but are significantly expensive.

Typical passive infra red sensors and Doppler effect sensors are deceivable by minimizing motion within the fields of view of the sensors. Furthermore, typical sensors are unable to distinguish between human occupants and other mobile animate occupants and inanimate occupants. Typical sensors are also unable to detect stationary occupants of an occupancy space, thereby causing errors in detection.

Some limitations of passive infra-red sensors and the Doppler effect sensors may be overcome by using imaging based sensors. However, these sensors typically run at full power during operation, thereby consuming a high amount of energy, rendering them unsuitable for battery powered operation.

Hence, there is a need for determining the class, attributes, and identity of an occupant in an occupancy space at a predefined time, or on the occurrence of an event, or at periodic intervals and for distinguishing between animate human occupants and other occupants, irrespective of the state of rest or of motion of the occupants.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
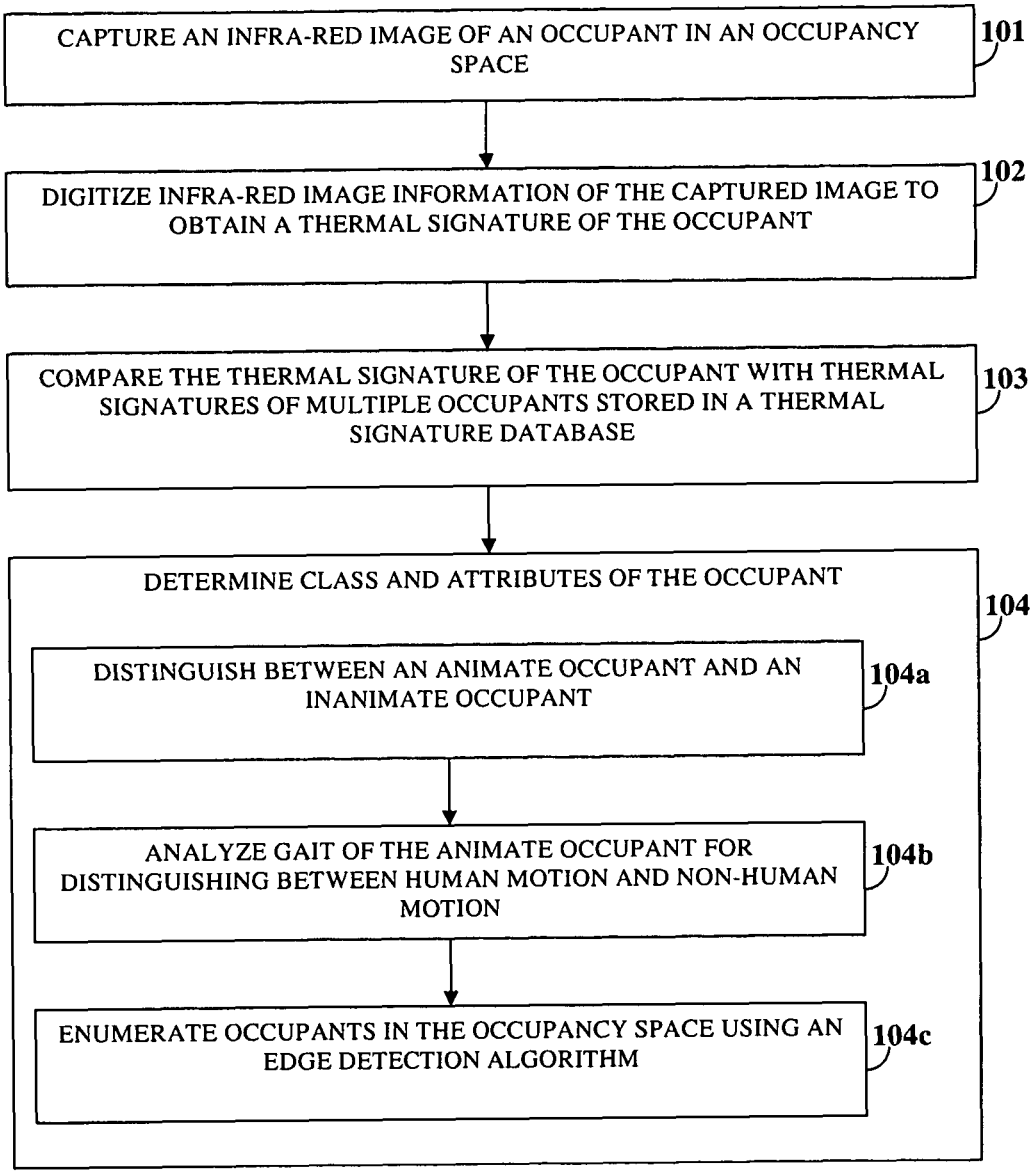
FIG. 1 illustrates a method of determining the class and attributes of an occupant in an occupancy space.

As used herein, an "occupant" refers to an animate or an inanimate object in an occupancy space. For example, an occupant may be a person, an animal, or a piece of furniture or equipment in the occupancy space.

An occupant in an occupancy space emits 3-dimensional radiation in the infra-red region. The shape, intensity, and frequency of this radiation comprise a characteristic infra-red emission pattern of the occupant.

As used herein, "thermal signature" refers to the digitized version of the infra-red emission pattern of an occupant in an occupancy space when the occupant is infra-red imaged using, for example, IR sensors. The infra-red sensor captures a 2-dimensional view of the 3-dimensional infra-red emission pattern. Hence, after the image capture by the sensor, only a 2-dimensional image version of the original 3-dimensional infra-red emission pattern is available to work with, for example, to digitize the infra-red image.

As used herein, "occupancy space" refers to a space, for example, a room in a building that may be occupied by animate or inanimate occupants. Also, as used herein "occupant class" refers to the general class of the occupant, for example, whether the occupant belongs to the animate class, inanimate class, human class, or non-human class. Each occupant class has class characteristics that define or are common for that occupant class. For example, biped motion is characteristic of a human class, quadruped motion is characteristic of a four-legged animal class, etc. Furthermore, as used herein, "attributes of an occupant" further defines the class of the occupant, for example, whether the occupant belonging to the animate class is an adult human, a child, a non-human animal, the number of such occupants and any other attribute of the occupant that may need to be determined.

An exemplary process for determining the class and attributes of an occupant is as follows. An infra-red image of an occupant in an occupancy space is captured by an infra-red sensor. The infra-red sensor may be tuned to be more sensitive to a specific set of frequencies in the infra-red region, or a filter that allows light of a specific infra-red frequency may be applied between the sensor and the lens collating the view of the occupancy space including the emission patterns of all occupants. The infra-red sensor has a number of elements or pixels arranged in a 2-dimensional array. Each pixel or element will generate a signal that is proportional to the intensity of the radiation received. The infra-red sensor thus captures a 2-dimensional view of this emission pattern as projected on the sensor surface. The captured image is then digitized in the form of a 2-dimensional matrix. Each element of this matrix represents the intensity of the image captured by the sensor element (pixel). The sensitivity of the sensor and the scale factor in the digitizing process is adjusted such that the digitized value of the pixel's signal would lie between 0-255. A larger value typically represents more intense infra-red radiation as seen by the sensor. The collection of matrix elements that have similar intensity would form a 2-dimensional shape that corresponds to an occupant.

Capturing the image with different frequency filters allows an estimation to be made of the frequency at which the occupant is emitting infra-red emission. For example, suppose an image is captured using three filters at 8, 12 and 16 micrometers. Three successive image captures are made using each of the above filters. Supposing it is found that the collection of pixels corresponding to an occupant A in the lower right corner of the image has a peak value when the 8 um filter is applied. Also, for example it is found that the collection of pixels corresponding to an occupant B in the upper left corner of the image has a peak value when the 16 um filter is applied. From this an inference may be made that occupant A is hotter than occupant B since it is radiating at a higher frequency or smaller wavelength. If animate objects typically have a temperature like that of occupant A, it may be inferred that occupant A is animate.

The thermal signature of the occupant is obtained as follows. The collection of matrix elements that have similar intensity and that form a correlation that corresponds to a 2-dimensional shape of an object are identified as in the paragraph above. Each occupant's emissivity pattern is represented in the digitized data by the value (i.e., the intensity) of the matrix elements and their correlation with each other (i.e., the shape) at a specific frequency. Applying filters with different pass bands for the infra-red light allows the frequency characteristics to be determined. This digital representation of the physical object's characteristic emission pattern is the thermal signature as seen by the system.

FIG. 1 illustrates a method of determining the class and attributes of an occupant in an occupancy space. An infra-red image of the occupant in the occupancy space is captured 101. The infra-red image of the occupant is captured at a predefined time, or on the occurrence of an event, or at periodic intervals. The infra-red image may be captured, for example, using infra-red (IR) sensors. The IR sensors may, for example, utilize charge coupled devices (CCDs), a quantum well infra-red photodetector (QWIP) array, microbolometers or complementary metal oxide semiconductor (CMOS) sensors for capturing the image.

The IR sensors may be battery powered. The IR sensors may be mounted on, for example, a wall, a ceiling, or on any object in the occupancy space. Prior to capturing the image, the IR sensors may run in a "sleep" mode that consumes low power. The sleep mode enhances battery life during battery powered operation of the IR sensors. The IR sensors enter a "wake up" mode for capturing the image. The IR sensors may go back to the sleep mode after capturing the image. Duration of the sleep mode and the wake up mode may be configured by a user. Typically, the duration of the sleep mode may be in the order of seconds and the duration of the wake up mode may be in the order of milliseconds.

In one embodiment, the image of the occupant in the occupancy space is captured as a single frame. As used herein, a frame is a complete set of data from the elements, for example, pixels of an image capture device. The image from the single frame of data is digitized to obtain a thermal signature of the occupant which is compared with thermal signatures of occupants stored in the thermal signature database to determine the class and attributes of the occupant in the occupancy space.

In another embodiment, the image of the occupancy space is captured and digitized as a succession of frames. Each frame may have a filter applied such that the image information may be captured at different frequencies of the infra-red region. In yet another embodiment, the image of the occupancy space is captured and digitized as a succession of frames to average the information on a per element basis and to detect differences between the individual frames and the computed mean value.

The image of the occupancy space is captured using infra-red imaging rather than visible spectrum imaging to eliminate the necessity of using an illumination source during the image capturing process. Non-use of an illumination source enables the image to be captured under low light conditions, for example, at night. Furthermore, the use of infra-red imaging is designed to ensure that the occupant is visibly unidentifiable from the captured image, thereby ensuring the privacy of the occupant. The method and system disclosed herein is applicable for the case where a determination is to be made only if the space is occupied by a person. In the embodiment where a specific occupant is identified in the occupancy space, the occupant may be required to give specific permission for the occupant's thermal signature to be scanned and stored in a thermal signature database for identification.

The infra-red image information of the captured image is digitized 102 to obtain a thermal signature of the occupant. Different analog to digital conversion methods may be used for digitizing the image information. The conversion methods may be based on successive approximation, sigma delta, or direct conversion. The digital representation of the infra-red image contains information of the emission patterns of the objects in an occupancy space including the intensity and frequency of the infra-red emission from each object. In addition, the shape of the emission pattern will correspond to the shape of the object as projected on the infra-red sensor.

To determine the class of an occupant, for example, humans, the common characteristics of that class, for example, the shape of a human and other common attributes of the human class are configured in different environments and stored as a thermal signature for that class in the thermal signature database. The thermal signature is obtained based on the intensity, frequency, and shape of the infra-red image of that occupant. The thermal signature of the occupant is compared 103 with thermal signatures of different classes and attributes common to each of the classes stored in a thermal signature database to determine the class of the occupant.

The thermal signature database can store two types of information. In the case where the class of an occupant is to be identified, for example an occupant belonging to the human class, the thermal signature database will be populated with a precompiled database containing thermal signatures of different classes and attributes common to those classes in different environments. In the case where a specific occupant is to be identified, the thermal signature database will be populated with the thermal signatures of occupants of that class against which the thermal signature of the specific occupant will be compared.

The determination 104 of the class and attributes of the occupant may comprise distinguishing 104a between an animate occupant and an inanimate occupant, for example, between a stationary person and a piece of furniture. The occupant may be categorized into categories using a probability matrix. If there are multiple occupants in the occupancy space, images of occupants in the class with highest probability of animate characteristics are processed. The animate occupant and the inanimate occupant may be distinguished using digital image processing algorithms. The digital image processing algorithms may refer to a pre-compiled thermal signature database of thermal signatures compatible with animate characteristics.

If the occupant identified is an animate occupant, the step of determining the class and attributes of the occupant may further comprise analyzing 104b the gait of the animate occupant for distinguishing between human motion and non-human motion. The gait may, for example, be analyzed for determining whether an animate occupant is an adult human occupant, a child, or a house pet. The gait analysis further distinguishes between animate occupants, for example, the analysis distinguishes a house pet from a human occupant. Furthermore, occupants in the occupancy space may be enumerated 104c using an edge detection algorithm. Edge detection is a method of image processing used to identify sharp changes in image brightness or discontinuities for determining the number of occupants in the occupancy space. Enumeration of the occupants may enable adaptive modification of a controlled function, for example, climate conditioning. For example, in a cooling system, if a large number of occupants are detected in the occupancy space, the cooling system may increase the rate of cooling to compensate for heat generated by the occupants.

If the occupant identified is a human, the specific identity of the human may be further identified by comparing the thermal signature of the human against the thermal signature of other humans stored in the thermal signature database.

The status of the determination of the class and the attributes of the occupant may also be indicated. The indication may be provided visually, for example, using a light emitting diode (LED) or a liquid crystal display (LCD) screen. The indication may also be provided aurally, for example, using a siren or an alarm tone. Furthermore, the indication may be provided to an external device or system. A relay or an electronic switch may be activated for providing the indication to the external device or system. The indication may also be transmitted as a message via wireless or wired transmission media using, for example, recommended standard 232 (RS232), Ethernet, ZigBee™ wireless protocol suite, controller area network (CAN) bus, etc. The transmission of the indication allows universal access to the indicated status, for example, via a secure web server displaying the status of a monitored area.

Figure 2:
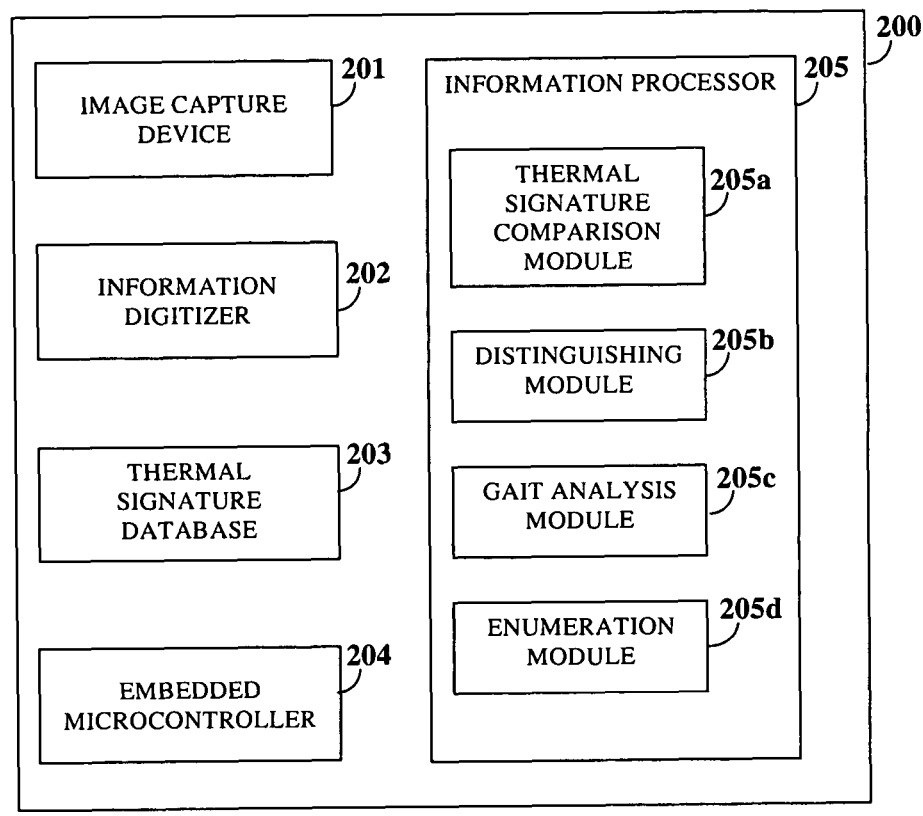
FIG. 2 illustrates a system for determining the class and attributes of an occupant in an occupancy space.

FIG. 2 illustrates a system 200 for determining the class and attributes of an occupant in an occupancy space at a predefined point in time, or on the occurrence of an event, or at periodic intervals. The system 200 disclosed herein comprises an image capture device 201, an information digitizer 202, a thermal signature database 203, an embedded controller 204, and an information processor 205.

The image capture device 201 captures an infra-red image of the occupant in the occupancy space. The image capture device 201 captures the infra-red image at a predefined time, or on the occurrence of an event, or at periodic intervals. The image capture device 201 may, for example, use IR sensors to capture the image. The image capture device 201 may use the IR sensors utilizing charge-coupled devices (CCDs) or complementary metal oxide semiconductor (CMOS) sensors for capturing the image. The image capture device 201 detects radiation in the infra-red range of the electromagnetic spectrum and produces electrical representations of that radiation.

In an embodiment, the image capture device 201 may use a plurality of sensors that are sensitive to different frequencies of the infra red-region. In another embodiment, the image capture device 201 may have a system that inserts a plurality of filters in front of the sensor. The filters may allow changing the sensitivity of the sensors to specific frequencies in the infra-red region.

The image capture device 201 may be battery powered. In between capturing successive images, the image capture device 201 may run in a low power consuming "sleep" mode. The sleep mode enhances battery life during battery powered operation of the image capture device 201. The image capture device 201 may enter the sleep mode on receiving a sleep instruction from the embedded microcontroller 204. The image capture device 201 enters a "wake up" mode for capturing the image of the occupancy space. The image capture device 201 may enter the wake up mode on receiving a wake up instruction from the embedded microcontroller 204. Duration of the sleep mode and the wake up mode may be configured by a user. Typically, duration of the sleep mode may be in the order of seconds and duration of the wake up mode may be in the order of milliseconds.

The information digitizer 202 digitizes infra-red information of the captured image to obtain a thermal signature of the occupant. The information digitizer 202 converts the infra-red image information of the captured image to a digital form.

The information digitizer 202 may use different sampling techniques to digitize the image information of the captured image. The sampling techniques may be based on methods such as successive approximation, direct conversion or pipeline analog to digital conversion (ADC). The information processor 205 processes the digitized image information of the occupant. The information processor 205 comprises a thermal signature comparison module 205a, a distinguishing module 205b, a gait analysis module 205c, and an enumeration module 205d.

The system 200 comprises a pre-compiled thermal signature database 203 of thermal signatures. The thermal signatures of the occupants stored in the thermal signature database 203 are taken against different environments. The thermal signature database 203 is used during the occupant class and attribute determination system operation to make a decision on the occupant, or the class of occupant in an occupancy space, for example, to identify an animate versus an inanimate occupant.

To initially create the thermal signature database 203, the image capture device 201 and the information digitizer 202 is used to make digital representations of the infra-red image of occupants in a variety of environments such as different room shapes with varying furnishings, different ambient environments, etc. In addition a visual image of the occupancy space may be captured. These representations may be stored on a general purpose workstation and displayed on a monitor. The captured infra-red data may be analyzed manually and based on the visual image, parts of the infra-red data consistent with human and animate characteristics, for example, gait, shape, body contour, etc. are identified and tagged to distinguish them from the background environment. The intensity of the infra-red emission, frequency of the infra-red emission and shape of the infra-red emission pattern characteristics that are common and consistent with different occupant classes across the entire data set are then summarized and stored in the thermal signature database 203. The shape of the emission pattern may also be used to resolve details such as the characteristic gait of biped motion of a human, or the quadruped motion of an animal. The thermal signature database 203 may be created based on a data structure optimized for comparison searches, for example, a binary tree.

The thermal signature comparison module 205a compares the thermal signature of the occupant with a set of previously stored thermal signatures of multiple occupants for determining the class and the attributes of the occupant. In an embodiment, the thermal signature comparison module 205a compares the thermal signature of the occupant with characteristics and attributes common to a class of occupants stored in a thermal signature database 203 for determining the class of the occupant.

The distinguishing module 205b distinguishes between animate occupants and inanimate occupants. The gait analysis module 205c distinguishes between human motion and non-human motion of the animate occupants. The gait analysis module 205c further distinguishes an animate occupant, for example, the gait analysis distinguishes between a house pet and a human occupant. The enumeration module 205d enumerates occupants, i.e., identifies the number of occupants in the occupancy space using an edge detection algorithm.

The embedded microcontroller 204 controls one or more of the following: capture of the image, the digitization of the captured image information, and the processing of the digitized image information. The embedded microcontroller 204 further controls indication of status of the determination of the class and the attributes of the occupant that may also be indicated via, for example, Wi-Fi™ or Ethernet.

Figure 3:
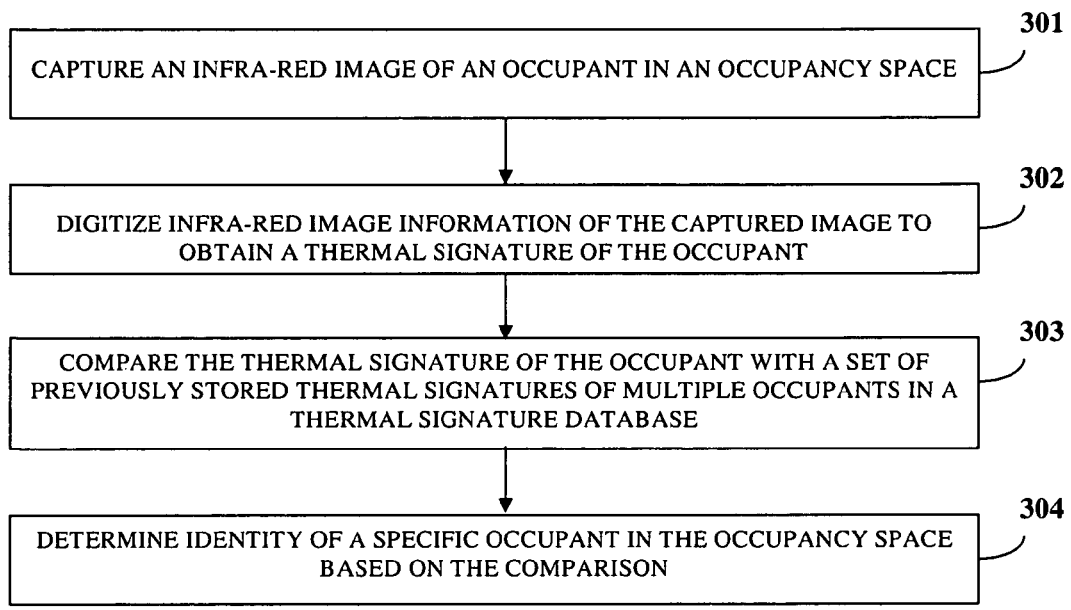
FIG. 3 illustrates a method of identifying a specific occupant in an occupancy space.

FIG. 3 illustrates a method of identifying a specific occupant in an occupancy space at a predefined time, or on the occurrence of an event, or at periodic intervals. An infra-red image of the occupant in the occupancy space is captured 301. The infra-red image information of the captured image is digitized 302 to obtain a thermal signature of the occupant. The thermal signature of the occupant is compared 303 against a set of previously stored thermal signatures of multiple occupants in the thermal signature database 203. The identity of the specific occupant in the occupancy space is determined 304 based on the comparison.

Figure 4:
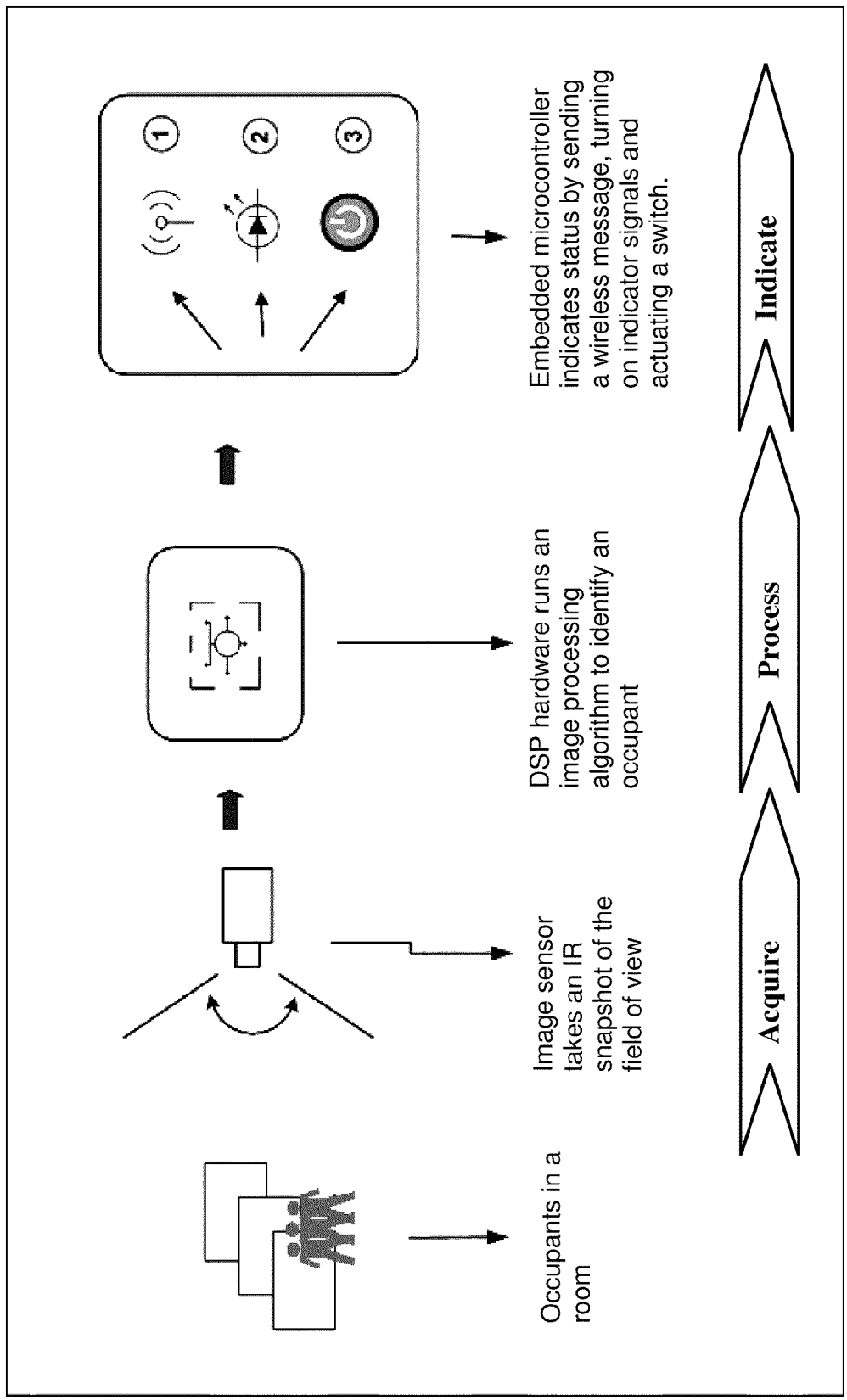
FIG. 4 exemplarily illustrates a system and process for determining the class and attributes of an occupant in an occupancy space to identify presence of an occupant.

FIG. 4 exemplarily illustrates a system and process for determining the class and attributes of an occupant in an occupancy space to identify the presence of an occupant. Consider an example of multiple occupants in an occupancy space, for example, a room of a house. An image sensor captures an infra-red snapshot of the field of view of the room. Digital signal processing (DSP) hardware runs an image processing algorithm for identifying the presence of the occupant. On detection of the occupant, the embedded microcontroller 204, for example, sends a wireless message, turns on indicator signals, or actuates a switch. The embedded microcontroller 204 may also control a controlled function, for example, heating the room, if a human occupant is detected.

Figure 5:
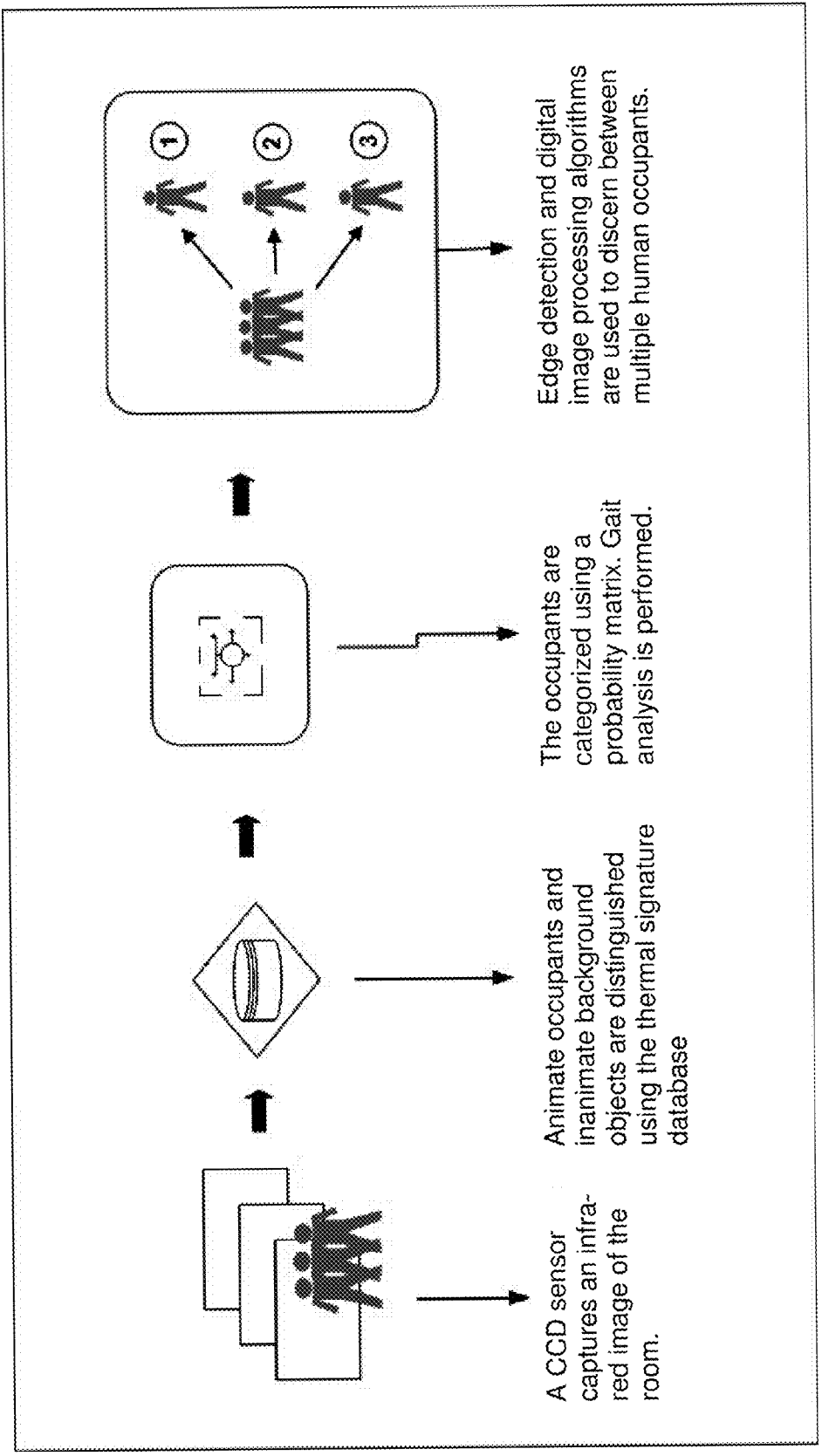
FIG. 5 exemplarily illustrates a system and process for determining the class and attributes of an occupant of an occupancy space to identify a human occupant.

FIG. 5 exemplarily illustrates a system and process for determining the class and attributes of occupants of an occupancy space to identify a human occupant. Consider an example of multiple occupants in a room. A CCD sensor captures an infra-red image of the room. Animate occupants and inanimate background objects are distinguished using thermal signatures stored in the thermal signature database 203. The occupants are categorized into categories using a probability matrix. Gait analysis is performed to distinguish between biped and quadruped motion. Furthermore, the gait analysis may also distinguish between human motion and non-human quadruped motion, for example, between a crawling child and a cat. Different edge detection and digital image processing algorithms are used to discern between the multiple human occupants. The multiple human occupants may be enumerated.

Consider an example of identification of a person in an occupancy space. An image of the occupant in the occupancy space is captured with an infra red sensor. The infra-red sensor is either natively most sensitive to the infra-red frequency band that humans emit, or has a filter applied that makes it most sensitive to that band. This captured image is digitized to get a 2-dimensional matrix of the intensity of the image at each pixel of the sensor. The values in the matrix vary as a number from 0-255. A larger value represents more intense infra red radiation as seen by the sensor. A group of neighboring elements in the matrix with similar values will represent an object. All the objects in the image are identified and ascribed shapes. Each object is compared with a thermal signature database 203 to determine if it meets the class characteristics and attributes defined as human. The thermal signature database 203 has a binary tree structure that describes the class characteristics and attributes that progressively lead to the probability of the occupant as belonging to the human class. At the first pass, some of these class characteristics and attributes may be common with humans and animals, for example, an image with an oval shape representing the head or torso. Objects meeting this requirement may be ascribed a higher probability of being animate. Each object identified in the image is given a probability. Objects with high probability of being animate are then compared against more specific criteria listed in the thermal signature database 203, for example, the image may be compared to see if they have other characteristics such as arms or legs which are straight appendages. If the object has appendages, then a check may be made against even more specific criteria in the thermal signature database 203. For example, one such criterion may be to check the position of the appendages in relation with the torso to see if the object exhibits biped or quadruped characteristics. In each case, successive image captures may be used to improve reliability and determine characteristics such as gait.

The method and system 200 disclosed herein may be stored and implemented on a chip. The information for the presence and identification of an occupant in an occupancy space may be coded into a specific chip that incorporates all the functions of the image capture device 201, the information digitizer 202, the embedded microcontroller 204, and interface mechanisms, for example, wireless circuitry. This chip may take the form of one single chip or a collection of such chips, for example an application specific integrated (ASIC) circuit, a system on a chip (SOC) or a field programmable general array (FPGA).

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, the embodiments are not limited to any specific combination of hardware and software. A "processor" means any one or more microprocessors, Central Processing Unit (CPU) devices, computing devices, microcontrollers, application specific integrated circuit (ASIC), field programmable general array (FPGA), digital signal processors or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks, electrically erasable programmable read only memory (EEPROM) such as flash memory and other persistent memory. Volatile media include Dynamic Random Access Memory (DRAM), Static Ram (SRAM), which typically constitutes the main memory. Transmission media include coaxial cables, copper wire, and fiber optics, including the wires that comprise a system bus coupled to the processor. Transmission media may include or convey acoustic waves, light waves and electromagnetic emissions, such as those generated during Radio Frequency (RF) and Infra-red (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

Where databases are described such as the thermal signature database 203, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables or trees, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. The devices may be in communication with any number and type of machines or computers.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A method of determining the class and attributes of an occupant object in an occupancy space, comprising:
    capturing an infra-red image of a plurality of occupant objects in said occupancy space;
    digitizing infra-red image information of said captured infra-red image to obtain a thermal signature of the occupancy space comprising said occupant objects;
    identifying said occupant objects in said digitized infra-red image and ascribing shapes to each of said occupant objects;
    comparing each of said identified occupant objects with a thermal signature database to determine if each of said occupant objects meets a given class and said attributes of said given class, comprising:
        performing a plurality of passes through a binary tree structure in said thermal signature database, said binary tree structure describing class characteristics and said attributes of said given class, said step of performing said passes comprises:
            performing a first pass, comprising assigning a probability to each of said occupant objects in said occupancy space, wherein said first pass further comprises assigning a higher probability to an occupant object which meets the class characteristics and the attributes of said given class; and
            performing a plurality of other passes, comprising:
                comparing occupant objects having said higher probability against specific class characteristics and specific attributes of said given class; and
                utilizing successive image captures in each of said other passes.

2. The method of claim 1, wherein said step of determining the class and the attributes of the occupant object comprises comparing said thermal signature of the occupant object with class characteristics and attributes common to a particular class of occupant objects stored in said thermal signature database, comprising the steps of:
    distinguishing between an animate occupant object and an inanimate occupant object;
    analyzing gait of said animate occupant object for distinguishing between human motion and non-human motion; and
    enumerating occupant objects in the occupancy space using an edge detection algorithm.

3. The method of claim 1, further comprising the step of indicating status of said determination of the class and the attributes of the occupant object.

4. The method of claim 1, wherein said infra-red image of the occupant object in the occupancy space is captured at a predefined time.

5. The method of claim 1, wherein the thermal signature is obtained based on intensity, frequency, and shape of said infra-red image.

6. The method of claim 1 wherein said thermal signatures of said occupant objects are taken against a plurality of different environments.

7. The method of claim 1 stored and implemented on a chip.

8. The method of claim 1, wherein said step of determining the class and the attributes of the occupant object further comprises determining identity of said occupant object in the occupancy space based on said comparison.

9. A system for determining the class and attributes of an occupant object in an occupancy space, comprising:
    an image capture device for capturing an infra-red image of a plurality of occupant objects in said occupancy space;
    an information digitizer for digitizing infra-red image information of said captured infra-red image to obtain a thermal signature of the occupancy space comprising said occupant objects;

a thermal signature database for storing thermal signatures of occupant objects, wherein said thermal signature database comprises a binary tree structure describing said class and said attributes of said thermal signatures of said occupant objects; and an information processor for processing said digitized image information, comprising:

- a thermal signature comparison module configured for identifying said occupant objects in said digitized infra-red image and ascribing shapes to each of said occupant objects;
- said thermal signature comparison module configured for comparing each of said identified occupant objects with said thermal signature database to determine if each of said occupant objects meets a given class and said attributes of said given class;
- said thermal signature comparison module configured for performing a plurality of passes through said binary tree structure in said thermal signature database, said binary tree structure further describing class characteristics and said attributes of said given class, comprising:
    - performing a first pass, comprising assigning a probability to each of said occupant objects in said occupancy space, wherein said first pass further comprises assigning a higher probability to an occupant object which meets the class characteristics and the attributes of said given class; and
    - performing a plurality of other passes, comprising: comparing occupant objects having said higher probability against specific class characteristics and specific attributes of said given class; and utilizing successive image captures in each of said other passes.

10. The system of claim 9, wherein said information processor further comprises a distinguishing module for distinguishing between an animate occupant object and an inanimate occupant object.

11. The system of claim 9, wherein said information processor further comprises a gait analysis module for analyzing gait of an animate occupant object for distinguishing between human motion and non-human motion.

12. The system of claim 9, wherein said information processor further comprises an enumeration module for enumerating occupant objects in the occupancy space.

13. The system of claim 9, further comprising an embedded microcontroller for controlling one or more of said capture of said infra-red image, said digitization of the captured image information, said processing of the digitized image information, and indicating status of said processed image information.

14. The system of claim 9, further comprising a thermal signature database for storing the thermal signature of the occupant object.

15. The system of claim 9, wherein the thermal signature database stores said thermal signatures of said occupant objects in different environmental settings.

16. The system of claim 9 stored and implemented on a chip.

17. A computer program product comprising a non-transitory computer-readable storage medium having computer readable program code embodied thereon, said computer-readable program code comprising:

- a first computer readable program code for capturing an image of a plurality of occupant objects in an occupancy space;
- a second computer readable program code for digitizing image information of said captured infra-red image to obtain a thermal signature of the occupant space comprising said occupant objects;
- a third computer readable program code for determining said class and said attributes of the occupant object; and
- said third computer readable program code for identifying said occupant objects in said digitized infra-red image and ascribing shapes to each of said occupant objects;
- said third computer readable program code for comparing each of said identified occupant objects with a thermal signature database to determine if each of said occupant objects meets a given class and said attributes of said given class;
- said third computer readable program code for performing a plurality of passes through a binary tree structure in said thermal signature database, said binary tree structure describing class characteristics and said attributes of said given class, said step of performing said passes comprises:
    - said third computer readable program code performing a first pass, comprising assigning a probability to each of said occupant objects in said occupancy space, wherein said first pass further comprises assigning a higher probability to an occupant object which meets the class characteristics and the attributes of said given class; and
    - said third computer readable program code performing a plurality of other passes, comprising:
        - said third computer readable program code comparing occupant objects having said higher probability against specific class characteristics and specific attributes of said given class; and
        - said third computer readable program code utilizing successive image captures in each of said other passes.

* * * * *